May 10, 1938.  E. H. BRAYER  2,116,777
METER
Filed May 29, 1937  4 Sheets-Sheet 1

INVENTOR
Edward Harold Brayer
BY
Popp & Popp
ATTORNEYS

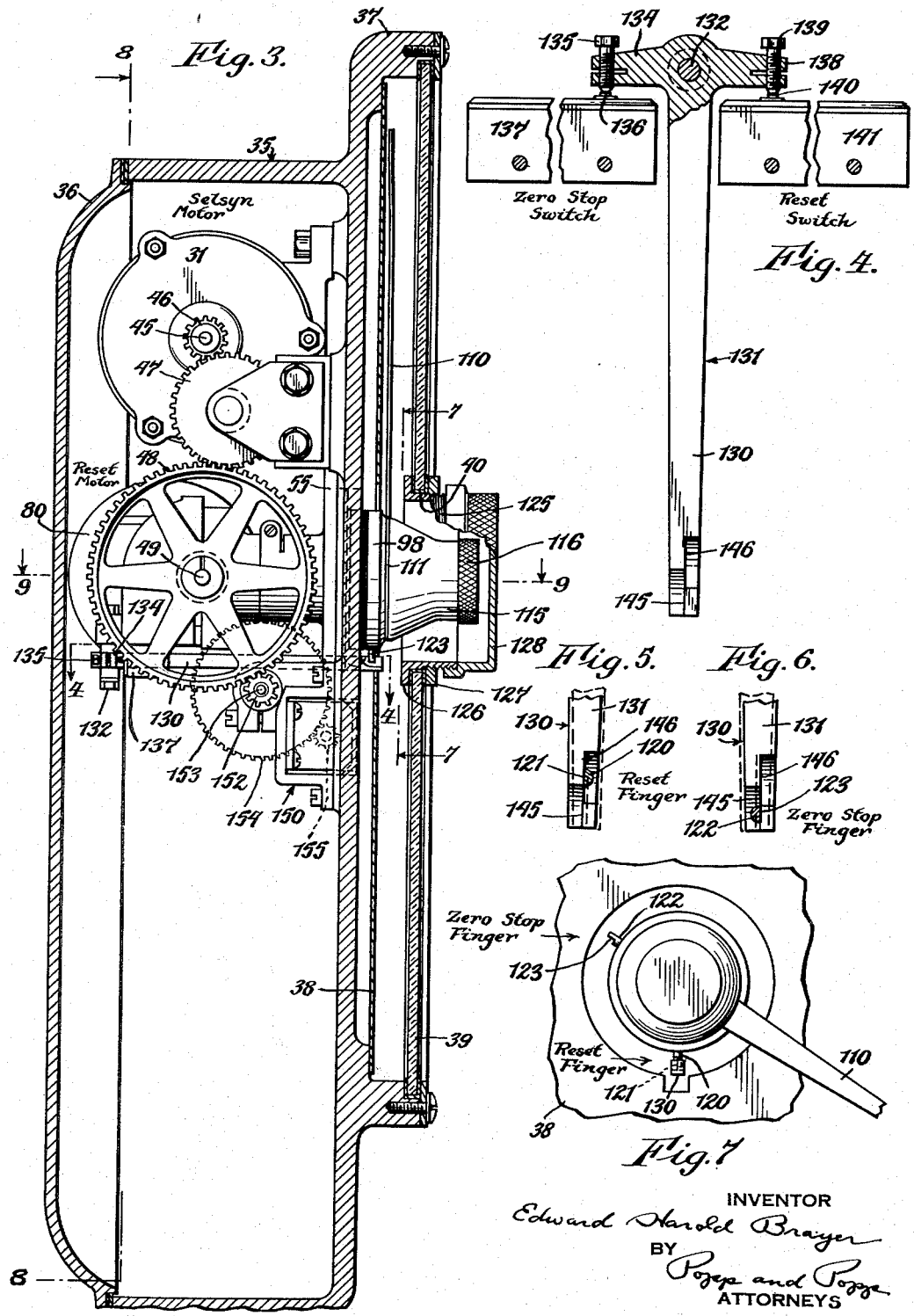

May 10, 1938. E. H. BRAYER 2,116,777
METER
Filed May 29, 1937 4 Sheets-Sheet 3

INVENTOR
Edward Harold Brayer
BY
Poyer and Poyer
ATTORNEYS

May 10, 1938.  E. H. BRAYER  2,116,777
METER
Filed May 29, 1937  4 Sheets-Sheet 4

INVENTOR
Edward Harold Brayer
BY
Popye and Popye
ATTORNEYS

Patented May 10, 1938

2,116,777

UNITED STATES PATENT OFFICE 2,116,777

METER

Edward Harold Brayer, Buffalo, N. Y., assignor to Brayer Brothers Construction Corporation, Buffalo, N. Y., a corporation of New York Application May 29, 1937, Serial No. 145,591

13 Claims. (Cl. 221—101)

This invention relates to a meter and more particularly to a liquid metering system in which the operator sets the mechanism to deliver a definite quantity of liquid and in which, after this quantity of liquid has been delivered, the mechanism automatically stops the flow and can reset itself to its original condition. The meter shown is primarily designed for use in mixing hot asphalt compounds, the present application being an improvement on the meters shown in my copending applications, Ser. No. 723,536, filed May 2, 1934, and Ser. No. 26,428, filed June 13, 1935.

As with my said co-pending applications, the invention is not limited to the particular field mentioned but has a wide range of uses, for example, in gasoline and oil service stations where it would enable the operator to take care of a number of pumps, since after the operator sets each pump to the desired gallonage, a delivery of fuel or oil and the resetting of the mechanism is automatic. Further, the invention can be readily adapted to self-service gasoline or oil pumps by the addition of a coin controlled mechanism and the invention can also be used in filling containers with a definite volume of liquid and by the addition of further well known automatic mechanisms, such as photoelectric cells or timing mechanisms, could be adapted to continuously fill containers on a moving belt with definite volumes of liquid. The invention can also be employed in connection with the blending of gasolines, lubricants and other liquids, blending being readily accomplished by having one or more meters operating in accordance with the invention and delivering the liquids to be blended through a common discharge. The invention can also obviously be used to measure the charge of water to a concrete mixer.

The principal object of the present invention is to provide a simple, reliable, compact and accurate liquid metering mechanism which includes a dial traversed by an indicator which can be set to any desired volume indication on the dial and which upon starting the flow of liquid through the meter is returned to zero after which the indicator hand is again set to the same volume indication on the dial preparatory to the next charge of liquid being delivered.

Another object of the present invention is to provide a metering system in which the setting, starting, stopping and indicating mechanism can be located at a point distantly remote from the meter so that the operation of supplying metered quantities of liquid can be controlled from any desired place and without reference to the location of the meter. If desired, of course, the indicating, setting, starting and stopping mechanism can be directly coupled to the meter.

Another object of the present invention is to provide, in such an automatic metering system, a differential gearing to which the metering mechanism, the resetting motor, and the indicating mechanism are permanently coupled, after the indicator has been set to the desired gallonage, thereby avoiding the necessity of using automatic cams, clutches or other throwout devices for making and breaking the drive between these mechanisms.

Another purpose of the present invention is to provide such a metering system in which the mechanism can be readily set to deliver the desired gallonage and will maintain this setting as long as the same volumes are desired to be delivered.

Another purpose of the present invention is to provide a remote control mechanism connected with the meter and with the fluid control valve in which the connection between these parts is entirely electrical.

Another object of the invention is to provide a simple and sensitive means for stopping the flow of liquid when the indicator hand reaches zero and simultaneously starting the reset motor.

A further aim of the present invention is to provide such a system in which parts of standard construction can be employed, thereby enabling the system to be manufactured at low cost; which is compact in construction and is composed of relatively few moving parts and which will operate efficiently to accurately deliver preselected quantities of liquid and will maintain its operating efficiency for a long period of time and under conditions of severe and continuous usage without getting out of order or requiring repairs.

In the accompanying drawings:

Fig. 3 is a vertical central section, through the indicating and automatic control mechanism, the same being taken on line 3—3, Fig. 1.

Fig. 4 is a horizontal section, taken on line 4—4, Fig. 3 and showing the arm which actuates the reset and zero stop switches when the indicator reaches its set and zero positions, respectively.

Figs. 5 and 6 are views similar to Fig. 4 and showing the switch arm engaged by the reset and zero stop fingers, respectively.

Fig. 7 is a vertical section, taken on line 7—7, Fig. 3 and showing the relation of the reset and zero stop fingers to the indicator and to the switch arm which they actuate.

Figure 1:
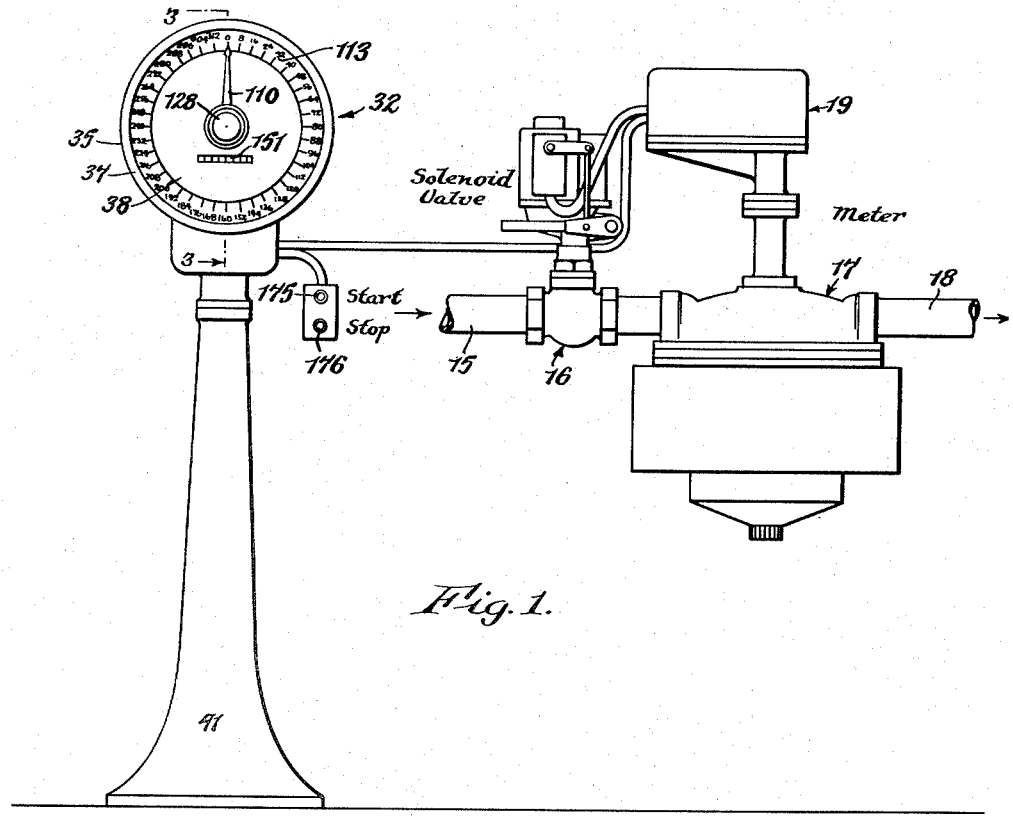
Fig. 1 is a front elevation of a meter electrically connected with a remotely located starting, stopping and indicating mechanism which can be set to deliver any desired volume of liquid and which when delivered actuates a solenoid valve to stop the flow of liquid through the meter and also reset itself.

In its general organization the present invention comprises a meter, a solenoid valve for starting and stopping the flow of liquid through the meter and an indicating mechanism which is operatively connected with the meter and includes a differential, one ring gear of which is driven by the meter, the other ring gear of which is driven by a reset motor and the spider of which drives an indicator finger and also actuates a zero stop and a reset switch so that when the desired gallonage has been delivered the main control valve is closed and the reset motor energized to return the indicator to the preselected position. The indicator mechanism also includes reset and zero stop fingers for actuating the reset and zero stop switches, the relation between which fingers is adjusted upon moving the indicator to any desired position along the dial so that the mechanism can be conveniently set to deliver repeated quantities of liquid in any desired volume. In the preferred form of the invention the meter drives one of a pair of Selsyn motors, the other of which drives one of the ring gears of the differential, the use of Selsyn motors permitting the indicating and control mechanism to be located at a point distantly remote from the meter.

The liquid to be metered is admitted from a liquid supply line 15 through a solenoid valve 16 and thence passes through a meter 17 to a discharge pipe 18. The meter 17 can be of any usual and well known construction and in the form of the invention shown in Figs. 1-9 drives a vertical shaft (not shown) which is connected to and drives a Selsyn motor 19. The solenoid valve 16 can be of any usual and well known construction and includes a movable core 20 which is drawn upwardly when the winding 21 of the solenoid is energized and opens the valve to admit liquid to the meter 17. The Selsyn motor 19 is connected with the main power lines 25 and 26 by branch lines 27 and 28 and this motor is also connected by three wires 30 with a second Selsyn motor 31 located in the casing of an indicating and control mechanism designated generally at 32. The Selsyn motor 31 also derives its power from the lines 27 and 28. Selsyn motors so coupled always rotate in unison so that as the Selsyn motor 19 is actuated by the main shaft of the meter 17 the other Selsyn motor 31 is similarly actuated. The Selsyn motor 31, as hereinafter explained, is employed to actuate the automatic indicating and control mechanism and it will therefore be seen that the two Selsyn motors 19 and 31 take the place of a direct connection between the metering shaft of the meter and the indicating mechanism and hence permit the indicating mechanism to be located at a point remote from the meter. If practicable such motors need not be used and the meter shaft can be directly connected as illustrated in Fig. 10.

The indicating and control mechanism is mounted in a casing 35, the rear of which is closed by a removable cover 36 and the front of which is formed with an annular rim 37 carrying a dial 38 and also a circular glass pane 39 which can be removably secured in the rim 37 in any sutable manner. The dial 38 is graduated in gallons or any other suitable measure and the glass pane 39 is provided with a central opening or hole 40 through which access is had for setting the indicating and control mechanism. The casing 35 is shown as mounted on a pedestal 41.

The Selsyn motor 31 is shown as mounted in any suitable manner within the upper part of the casing 35 and its shaft 45 carries a pinion 46 driving a gear 47 which in turn drives a gear 48 secured to one of the shafts 49 of the differential 50. The differential is supported by a bracket 55 which is bolted to the casing 35 over a central opening 56 in the front casing wall, the opening 56 being in line with the opening 40 in the glass plate 39.

Figure 9:
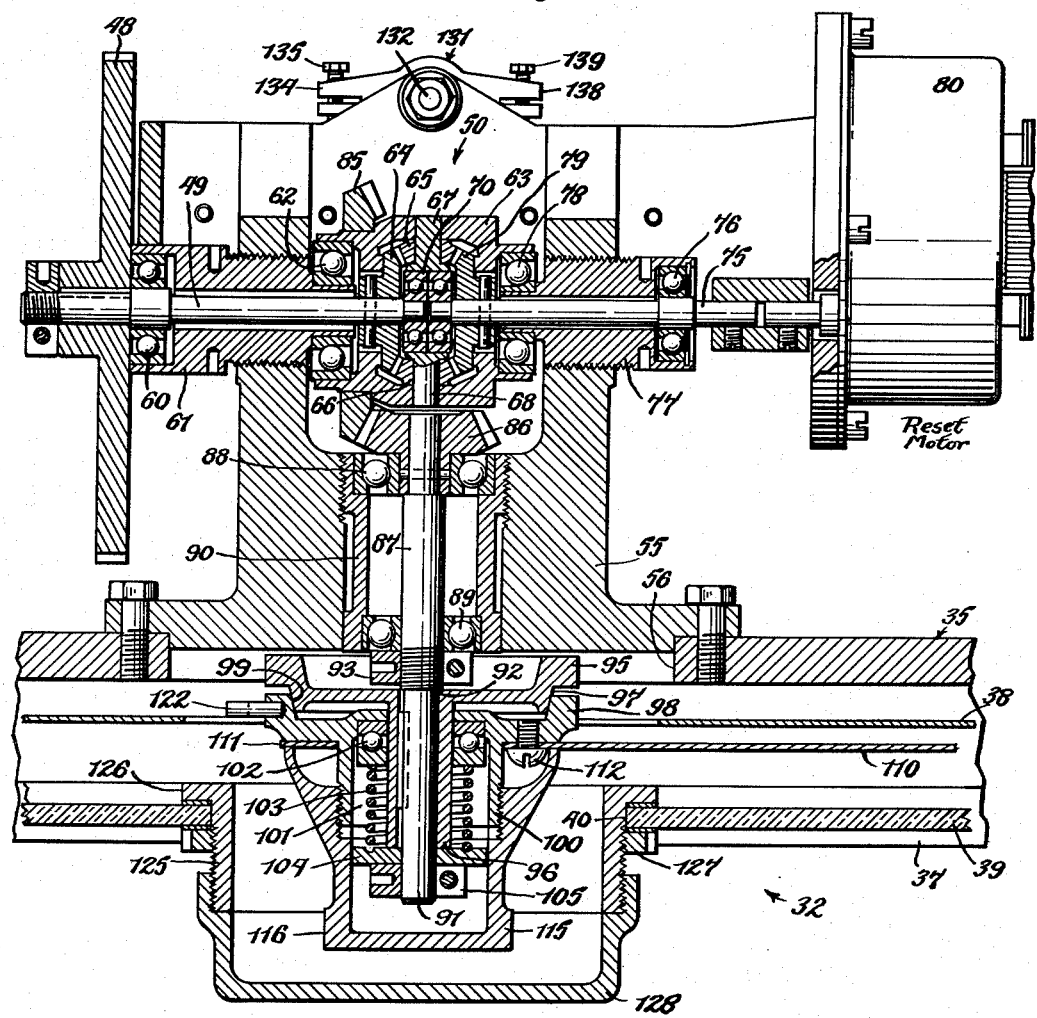
Fig. 9 is a horizontal fragmentary section, taken on line 9—9, Fig. 3.
Figure 10:
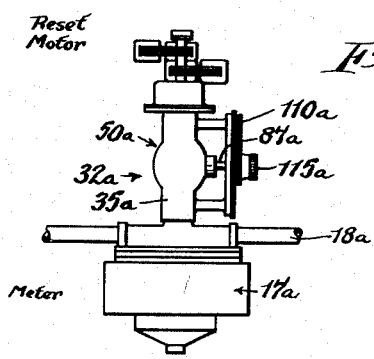
Fig. 10 is a front elevation of a modified form of my invention wherein the indicating and automatic control mechanism is mounted directly on the meter casing instead of being remotely located as shown in Figs. 1-9.

As best shown in Fig. 9 the differential shaft 49 is supported at its outer end in a roller bearing 60 carried by a bushing 61 which is screwed into the bracket 55 and at its other end is reduced to form a support for a roller bearing 62 which supports one side of the spider 63 of the differential. To the inner end of the shaft 49 is pinned a ring gear 64 which meshes with a pair of pinions 65 and 66 carried on pins 67 and 68 which project radially inward from the spider 63. The inner ends of the pins 67 and 68 support a pair of roller bearings 70, one of which supports the extreme inner end of the differential shaft 49.

The differential includes a reset shaft 75 which is carried at its outer end in a roller bearing 76 provided in a bushing 77 similar to the bushing 61. The inner end of this bushing supports a roller bearing 78 for the opposite side of the differential spider 63 and the extreme inner end of the reset shaft 75 is supported in the other roller bearing 70. To the inner end of the reset shaft 75 is pinned a ring gear 79 which meshes with the pinions 65 and 66 and the reset shaft 75 is driven by a reset motor 80, this motor being mounted in any suitable manner within the casing 35.

The spider 63 of the differential carries a bevel gear 85 which drives a bevel pinion 86 fast to a horizontal indicator shaft 87, this shaft projecting outwardly through the holes 56 and 40 in the casing 35 and glass plate 39, as best shown in Fig. 9. The shaft 85 is supported by a pair of roller bearings 88, 89 carried by a bushing 90 screwed into the bracket 55 and its outer end is reduced as indicated at 91 to provide a shoulder 92. Inward movement of the shaft 87 is limited by a clamping collar 93 which is screwed on the outer end of the enlarged part of the shaft 87.

A reset finger or pin is mounted in fixed relation to the shaft 87 and the indicator and the zero stop finger or pin are adjustably mounted on the shaft 87 so that the relation between the two pins can be manually adjusted to secure the desired delivery of liquid. For simplicity the adjustable connection between the indicator and zero stop finger and the shaft 87 comprises a cone clutch having a manually releasable driven part which carries the indicator and the zero stop finger and having a driving part which carries the reset pin. This cone clutch, as best shown in Fig. 9, comprises a driving conical clutch member 95 which has an elongated forwardly extending hub 96 keyed to the reduced part 91 of the indicator shaft 87 and held against the shoulder 92, as hereinafter described. This driving clutch member 95 has a conical clutch face 97.

The driven clutch member 98 is formed with a conical clutch face 99 adapted to engage the face 97 and is also provided with a forwardly extending threaded neck 100 which surrounds the hub 96 of the driving clutch member and is spaced therefrom to form a chamber 101. In the rear end of this chamber 101 is arranged a thrust bearing 102 against which a helical compression spring 103 bears, the other end of the spring bearing against a washer 104 which seats against a clamping collar 105 at the extreme forward end of the indicator shaft 87. It will be seen that the spring 103 urges the driven clutch member 98 into driving engagement with the driving clutch member 95 and hence insures that the two clutch members rotate with the indicator shaft 87.

The indicator 110 is fixedly mounted on the driven clutch member 98 having for this purpose a circular attaching portion 111 which fits around the threaded neck 100 and is held in place by a screw 112. The indicator 110 is in the form of a pointer which, as best shown in Fig. 1, traverses a series of graduations 113 on the dial 38.

In order to manually adjust the driven clutch member 98 relative to the driving clutch member, a knob 115 is screwed on the threaded neck 100 and in addition to enclosing the spring means for holding the clutch parts together is provided with a knurled portion 116 by means of which the knob can be gripped to draw the driven clutch member 98 axially outward, thereby releasing the clutch faces 97 and 99 and permitting the driven clutch member, and the indicator 110, to be turned to any position relative to the indicator shaft 87.

The driving clutch member 95 carries at its periphery a reset finger 120 which is cut away to provide a flat face 121 at its center, this flat face extending radially of the shaft 87. Similarly, the zero stop finger 121 is mounted on the periphery of the driven clutch member 98 and is preferably arranged directly opposite the indicator 110 and is provided with a flat face 123 opposing the flat face 121 of the reset pin 120.

In the meter system shown the meter is intended to deliver successive equal amounts of liquid and hence the setting is readjusted infrequently. A simple enclosure for the knob 115 is therefore provided consisting, as shown in Fig. 9, of an externally threaded collar 125 arranged in the opening 40 through the glass plate 39 and having an annular flange 126 bearing against the rear face of this glass plate. The collar is held in position by a threaded clamping ring 127 which bears against the front face of the glass plate. A removable cap 128 is screwed over the forwardly projecting end of the sleeve 125 and it will be seen that by removing the cap 128 the knob 115 is readily accessible for adjusting the metering mechanism.

The reset and zero stop pins 120, 122 strike the opposite sides of the long forwardly projecting arm 130 of a horizontal T-shaped switch lever indicated generally at 131. As best shown in Figs. 3, 4, 8 and 9 this switch lever is mounted on a vertical pin 132 which is carried by the bracket 55 and the long arm 131 extends into the paths of the reset and zero stop pins 120 and 122. The short arm 134 of the switch lever carries an adjusting screw 135 which engages and moves the buttons 136 of a micro-switch 137, this switch being a zero stop switch. The other short arm 138 carries an adjusting screw 139 which engages and moves the button 140 of a reset micro-switch 141. The micro-switches 137 and 141 are of usual and well known construction and operate, with a very slight inward movement of their buttons, to open an electrical circuit therethrough. In order to render the switch arm 131 very sensitive in its response to engagement by the pins 120 and 123 the extreme end of the long arm 130 thereof is cut away on one side to form a central shoulder 145 and is cut away on the other side to form a central shoulder 146. These shoulders 145 and 146 are in line with one another and are engaged by the flat faces 121 and 123 of the pins 120 and 122. It will be seen that by this means the movement of the switch arm 131 is very slight because both the reset pin and the zero stop pin engage the switch arm in the same plane and because the micro-switches 137 and 141 are extremely sensitive to slight movement of the switch arm.

If desired a register can be incorporated which indicates the total volume of liquid which has passed through the meter. The register forms no part of the present invention and is hence generally indicated as a casing 150 containing a totalizing mechanism of any usual and well known construction, the results of the totalizing being viewable through a slot or opening 151 in the front wall of the casing 35. The totalizing mechanism can be driven from the large gear wheel 138 which is shown as driving a pinion 152 on a shaft 153 carried by the casing 150 to which is also secured a large gear 154 meshing with a pinion 155 on a shaft 156 extending through the casing 150. The gear ratio is such that as the meter delivers a unit quantity of liquid the totalizing mechanism within the casing 150 is actuated to give a corresponding indication through the slot or opening 151.

Figure 2:
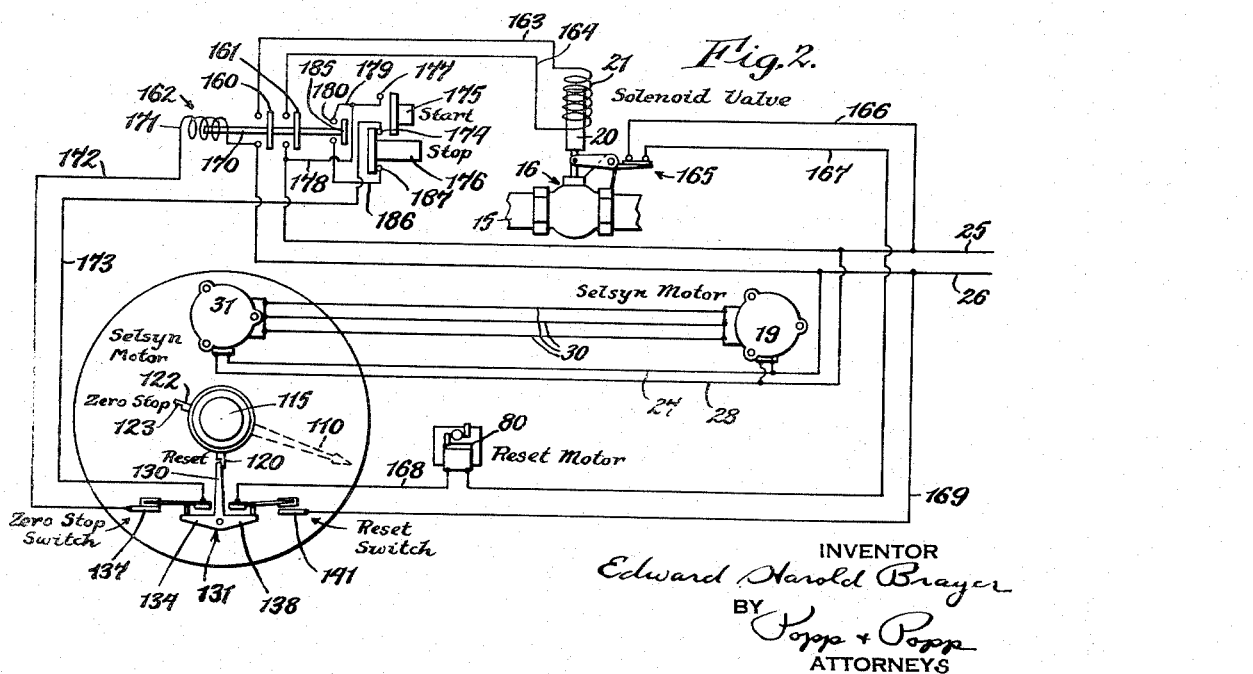
Fig. 2 is a wiring diagram showing the electrical connections between the various parts.
Figure 8:
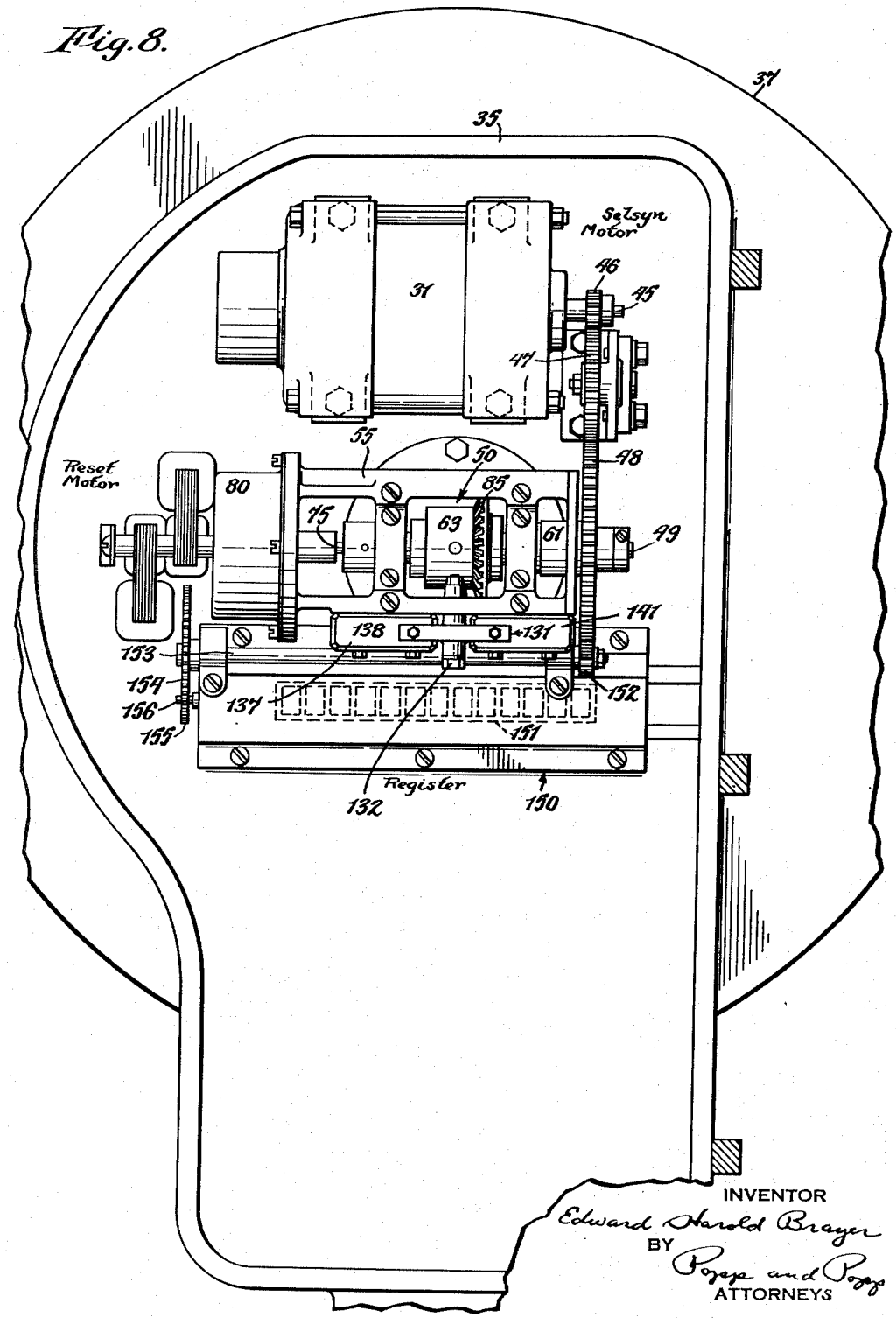
Fig. 8 is a vertical fragmentary section, taken on line 8—8, Fig. 3.

Referring now to the wiring diagram shown in Fig. 2, the power lines 25 and 26 supplying alternating current at, say, 110 volts, are connected by a pair of contactors 160, 161 of a main switch 162 with the lines 163 and 164 connecting with the winding 21 of the solenoid valve 16. When the solenoid of the valve 16 is so energized through the switch 162 the movement of its core 20 opens a switch 165 between lines 166 and 167 of an indicator hand return circuit. This circuit includes the line 166 connected with the power line 25; the switch 165; the line 167; the reset motor 80; a line 168; the reset switch 141; and a line 169 connected with the other side 26 of the main power line, all being in series.

The contactors 160 and 161 are mounted on the armature 170 of a holding relay, the winding 171 of which is connected at one end to the main power line 26 and at its other end to a line 172, this line 172 connecting with one of the terminals of the zero stop micro-switch 137. The other contact of this micro-switch is connected by a line 173 with the contact 174. This contact 174 is mutual to a normally open start button 175 and a normally closed stop button 176. On pushing the start button 175 an electrical circuit is established between the contact 174 and a contact 177, this contact 177 being connected by a line 178 with the other side 25 of the main power line and also by a line 179 with a contact 180. This contact 180 is engaged by a contactor 185 on the armature 170. When the holding relay 162 is energized this contactor 185 establishes a circuit from the side 25 of the line, lines 178 and 179, contact 180 through a line 186 to a contact 187 normally engaged by the stop switch 176.

It is obvious, of course, that the Selsyn motors 19 and 31 need only be employed when it is desired to locate the indicating and control mechanism at a point remote from the meter 17. It is apparent that if practicable these Selsyn motors can be eliminated and the meter shaft (not shown) coupled directly with the differential shaft 49 (Fig. 9). Such an arrangement is indicated in Fig. 10 in which the differential mechanism is shown as contained within a casing 35a directly connected with the casing of the meter 17a. The differential mechanism within the casing 35a is exactly the same as shown in Fig. 9, except that the shaft of the meter is connected mechanically with the differential shaft 49, the other differential shaft 75 being driven by the reset motor 80a. The indicator shaft 87a is driven at one time by the meter 17a and at another time by the reset motor 80a in the same manner as in the preferred construction, an indicator hand 110a and adjusting knob 115a being similarly provided to secure the desired adjustment in the amount of fluid delivered.

Operation

Assuming that it is desired to deliver 120 gallons of liquid, the operator removes the cap 128 (Fig. 9) and draws the knob 115 forwardly so as to disengage the clutch faces 97 and 99 and enable the driven part 98 of the clutch, together with the indicator 110 and zero stop finger 122 carried thereby, to be rotated independently of the indicator shaft 87. The operator then turns the knob 115 until the indicator hand 110 is set at the numeral "120" on the dial 38 and releases the knob 115. This position of the parts is indicated in Fig. 7. Upon releasing the knob 115 the spring, bearing against the roller bearing 102, moves the driven part 98 of the clutch into reengagement with the driving part 95 of this clutch and thereby reestablishes a driving connection between the indicator shaft 87 and the driven part 98 of the clutch. The operator may then replace the cap 128. The operator thereupon presses the start button (Fig. 2) thereby closing a circuit from the side 25 of the main power line; wire 178; contact 177; closed start button 175; contact 174; wire 173; closed zero stop switch 137; line 172 and winding 171 of the main switch 162 to the other side 26 of the main power line. The energization of the winding 171 of the main switch 162 moves the armature 170 to establish circuits through the contactors 160, 161 and 185. Therefore, after the start button 175 is released, current continues to flow through the winding 171 of the main switch 162, through a circuit which comprises the side 25 of the main power line; line 178; wire 179; contact 180; contactor 185; wire 186; contact 187; closed stop button 176; contact 174; wire 173; closed zero stop switch 137; line 172; and winding 171 of main switch 162 to the other side 26 of the line.

The closing of the contactors 160 and 161 establishes a circuit from the side 25 of the main power line through closed contactor 161; wire 164; winding 21 of the solenoid valve 16; wire 163 and closed contactor 160 to the other side 26 of the main power line. The energization of the winding 21 of the solenoid valve 16 immediately causes the switch 165 to open and at the same time opens the valve 16 so that liquid is permitted to flow from the supply pipe 15, past the open valve 16, through the meter 16 and out through the outlet line 18. The meter immediately starts to operate and its shaft (not shown) turns the Selsyn motor 19, this motor effecting a corresponding movement of its companion Selsyn motor 31. The shaft 45 of the Selsyn motor 31 therefore turns the pinion 46; gears 47 and 48 and differential shaft 49 in synchronism with the operation of the meter and since at this time the reset motor 80 is deenergized, the other differential shaft 75 (Fig. 9) is held stationary and hence the turning of the differential shaft 49 in response to the movement of the meter causes the ring gear 64 to rotate the pinions 65 and 66 and rotate the spider 63 of the differential. The bevel gear 85 secured to this spider 63 turns the bevel gear 86 fast to the indicator shaft 87. The rotation of the indicator shaft 87 causes a rotation of the clutch driving member 95 keyed thereto and, since the conical faces 97 and 99 of the clutch are held in engagement with one another, causes a similar rotation of the driven part 98 of the clutch, thereby moving the pointer or indicator 110 and the zero stop and reset fingers 122 and 120 in a counterclockwise direction.

When the indicator or pointer 110 reaches the zero position the zero stop finger 122 engages the shoulder 145 of the long arm 130 of the T-shaped switch arm 131 and, as shown in Figs. 2 and 4, shifts this switch arm so as to open the zero stop switch 137 and close the reset switch 141. The opening of the zero stop switch 137 breaks the circuit through the winding 171 of the main switch 162 which releases the armature 170 and opens the contactors 160, 161 and 179. Since current is supplied to the winding 21 of the solenoid valve 16, through the contactors 160 and 161, the breaking of the circuit through these contactors 160 and 161 deenergizes the solenoid valve 16 which immediately closes and cuts off the further flow of liquid through the meter. At the same time the deenergization of the winding 21 of the solenoid valve closes the switch 165. With the switches 165 and 141 closed it will be seen that a circuit is established from the side 25 of the main power line through line 166; closed switch 165; line 167, reset motor 80; closed reset switch 141 and line 169 to the other side 26 of the main power line.

Since at this time the meter 17 is inoperative the Selsyn motors 19 and 31 are held against movement (Fig. 9) and the differential shaft 49 is held stationary. Energization of the reset motor 80, through its differential shaft 75 and ring gear 79, causes the pinions 65 and 66 of the differential to be rotated, thereby rotating the spider 63 in the opposite direction from that effected by the Selsyn motor 31. This reversed motion of the spider 31 rotates the bevel gears 85 and 86 and the indicator shaft 87, thereby rotating the driving and driven parts 95 and 97 of the clutch and turning the reset and zero stop fingers 120 and 122 and the indicator 110 in a clockwise direction. The return movement of the indicator hand 110 continues until it reaches the original setting (the numeral 120) on the dial 38 at which point the reset finger 120 strikes the shoulder 146 of the T-shaped switch arm 131 and, as best shown in Figs. 2 and 4, closes the zero stop switch 137 and opens the reset switch 141. The opening of the reset switch 141 breaks the circuit through the reset motor 80 and hence further movement of the indicator 110 is arrested and it is stopped at the original setting, namely 120 gallons on the graduated scale 113. The apparatus is therefore in the condition assumed at the beginning of the description of the operation and to deliver another charge of 120 gallons the operator need only press the start button 175 upon which the cycle of operations will be repeated.

It will be seen that upon setting the driven clutch member 98 and the indicator 110 carried thereby to any point along the graduated scale 113, the distance between the reset and zero stop fingers 120 and 122 is adjusted accordingly, so that these fingers, by striking the opposite sides of the switch arm 131 will control the operation of the solenoid valve 16 to deliver the exact amount of liquid corresponding to the setting of the indicator 110.

Should it be desirable to stop the flow of liquid at any time the operator can press the stop button 176. The pressing of this stop button opens the circuit through the winding 171 of the main switch 162 and thereby causes the contactors 160 and 161 to open and deenergize the solenoid valve 16. This deenergization of the solenoid valve closes the switch 165 and thereby establishes a circuit through the reset motor 80 and closed reset switch 141 so as to return the indicator hand 110.

From the foregoing it will be seen that the present invention provides an extremely simple, compact, inexpensive and accurate meter in which the amount to be delivered can be preselected and which will deliver the preselected volume of the liquid and automatically restore the indicator hand to its set position ready for another delivery of the same amount of liquid upon pressing the start button. It will also be noted that the meter avoids the necessity of automatic clutches and cams for effecting reverse movements of the control and indicating mechanism through the action of the meter and through the action of the reset motor, this reversal being effected by the simple expedient of providing the differential shown with which the meter and the reset motor are constantly coupled.

I claim as my invention:

1. In a fluid metering system, metering means, means controlling the flow of fluid therethrough, a shaft, means for driving said shaft in synchronism with said metering means, a reset motor for driving said shaft in the opposite direction to reset the parts to initial position, a member normally driven by said shaft, means for manually adjustably rotating said member relative to said shaft, a finger moved in response to the rotation of said member, a second finger moved in response to the rotation of said shaft, means actuated by said first finger for actuating said controlling means to stop the flow of fluid through said metering means and energizing said reset motor and means actuated by said second finger for deenergizing said reset motor whereby the spacing of said fingers regulates the quantity of fluid delivered.

2. In a fluid metering system, metering means, means controlling the flow of liquid therethrough, manually operable means for opening said valve and including means for releasably holding said controlling means in position to permit the flow of fluid through said metering means, a shaft, means for driving said shaft in synchronism with said metering means, a reset motor for driving said shaft in the opposite direction to reset the parts to initial position, a member normally driven by said shaft, means for manually adjustably rotating said member relative to said shaft, a finger moved in response to the rotation of said member, a second finger moved in response to the rotation of said shaft, means actuated by said first finger for actuating said controlling means to stop the flow of fluid through said metering means and energizing said reset motor and means actuated by said second finger for deenergizing said reset motor whereby the spacing of said fingers regulates the quantity of fluid delivered.

3. In a fluid metering system, metering means, means controlling the flow of fluid therethrough, a shaft, means for driving said shaft in synchronism with said metering means, a reset motor for driving said shaft in the opposite direction to reset the parts to initial position, a member mounted on and normally driven by said shaft, means for manually adjustably rotating said member relative to said shaft, a finger moved in response to the rotation of said member, a second finger moved in response to the rotation of said shaft, means actuated by said first finger for actuating said controlling means to stop the flow of fluid through said metering means and energizing said reset motor, and means actuated by said second finger for deenergizing said reset motor whereby the spacing of said fingers regulates the quantity of fluid delivered.

4. In a fluid metering system, metering means, means controlling the flow of fluid therethrough, a shaft, means for driving said shaft in synchronism with said metering means, a reset motor for driving said shaft in the opposite direction to reset the parts to initial position, a member mounted on and normally driven by said shaft, means for manually adjustably rotating said member relative to said shaft, indicating means driven by said member, a finger moved in response to the rotation of said member, a second finger moved in response to the rotation of said shaft, means actuated by said first finger for actuating said controlling means to stop the flow of fluid through said metering means and energizing said reset motor, and means actuated by said second finger for deenergizing said reset motor whereby the spacing of said fingers regulates the quantity of fluid delivered.

5. In a fluid metering system, metering means, means controlling the flow of fluid therethrough, a shaft, means for driving said shaft in synchronism with said metering means, a reset motor for driving said shaft in the opposite direction to reset the parts to initial position, a member mounted on and normally driven by said shaft, means for manually adjustably rotating said member relative to said shaft, a finger moved in response to the rotation of said member, a second finger moved in response to the rotation of said shaft, an arm in the paths of said fingers and moved in opposite directions thereby, the faces of said arm struck by said fingers being disposed in the same plane, means actuated by the movement of said arm effected by said first finger for actuating said controlling means to stop the flow of fluid through said metering means and energizing said reset motor, and means actuated by the reverse movement of said arm effected by said second finger for deenergizing said reset motor whereby the spacing of said fingers regulates the quantity of fluid delivered.

6. In a metering system, metering means, means controlling the flow of fluid therethrough, a shaft, means for driving said shaft in synchronism with said metering means, a reset motor for driving said shaft in the opposite direction to reset the parts to initial position, a driving clutch member mounted on said shaft and compelled to rotate therewith, a driven clutch member rotatably mounted on said shaft and movable axially into engagement with said driving clutch member and manually releasable therefrom, a spring interposed between said shaft and said driven clutch member and yieldingly holding said clutch members in engagement, a finger moved in response to the rotation of said driven clutch member, a second finger moved in response to the rotation of said shaft, means actuated by said first finger for actuating said controlling means to stop the flow of fluid through said metering means and energizing said reset motor and means actuated by said second finger for deenergizing said reset motor whereby the manual spacing of said fingers regulates the quantity of fluid delivered.

7. In a metering system, metering means, means controlling the flow of fluid therethrough, a shaft, means for driving said shaft in synchronism with said metering means, a reset motor for driving said shaft in the opposite direction to reset the parts to initial position, a driving clutch member mounted on said shaft and compelled to rotate therewith, a driven clutch member rotatably mounted on said shaft and movable axially into engagement with said driving clutch member and manually releasable therefrom, a spring interposed between said shaft and said driven clutch member and yieldingly holding said clutch members in engagement, a thrust bearing between one end of said spring and the corresponding part against which said spring bears, a manually engageable cap secured to said driven clutch member and housing said spring, thrust bearing and the end of said shaft, said cap being formed to provide a manually engageable knob, a finger moved in response to the rotation of said driven clutch member, a second finger moved in response to the rotation of said shaft, means actuated by said first finger for actuating said controlling means to stop the flow of fluid through said metering means and energizing said reset motor and means actuated by said second finger for deenergizing said reset motor whereby the manual spacing of said fingers regulates the quantity of fluid delivered.

8. In a fluid metering system, metering means, a shaft, means for driving said shaft in synchronism with said metering means, an indicator mechanism, a reset motor for returning said indicator mechanism to an initial position, a differential gear permanently connected with and alternately driven by said reset motor and shaft, said indicator mechanism being driven by said differential gear, means for controlling the flow of fluid through said metering means and means for operating said controlling means and reset motor.

9. In a fluid metering system, metering means, a shaft, means for driving said shaft in synchronism with said metering means, an indicator mechanism, a reset motor for returning said indicator mechanism to an initial position, a differential gear permanently connected with and alternately driven by said reset motor and shaft, said indicator mechanism being driven by said differential gear, means for controlling the flow of fluid through said metering means and means for operating said controlling means and reset motor through motion derived from said differential gear.

10. In a fluid metering system, metering means, means controlling the flow of fluid through said metering means, a shaft, means for driving said shaft in synchronism with said metering means, a reset motor, a differential gear permanently connected with and alternately driven by said reset motor and shaft, and control means for said reset motor and controlling means actuated through motion derived from said differential gear.

11. In a fluid metering system, metering means, means controlling the flow of fluid through said metering means, a shaft, means for driving said shaft in synchronism with said metering means, a differential gear including a pair of ring gears, a spider, and pinions rotatably mounted on said spider and meshing with both of said ring gears, means connecting said shaft to one of said ring gears to drive said spider, a reset motor driving the other ring gear to rotate said spider in the opposite direction to reset the parts to initial position, and means actuated by said spider for operating said controlling means and reset motor comprising a shaft driven by said spider, a pair of fingers moved in response to the rotation of said shaft, means actuated by one of said fingers for actuating said controlling means to stop the flow of fluid through said metering means and energizing said reset motor and means actuated by the other finger for deenergizing said reset motor whereby the spacing of said fingers determines the quantity of fluid delivered.

12. In a fluid metering system, metering means, means controlling the flow of fluid through said metering means, a shaft, means for driving said shaft in synchronism with said metering means, a differential gear including a pair of ring gears, a spider, and pinions rotatably mounted on said spider and meshing with both of said ring gears, means connecting said shaft to one of said ring gears to drive said spider, a reset motor driving the other ring gear to rotate said spider in the opposite direction to reset the parts to initial position, and means actuated by said spider for operating said controlling means and reset motor comprising a shaft driven by said spider, a pair of fingers moved in response to the movement of said shaft, means actuated by one of said fingers for actuating said controlling means to stop the flow of fluid through said metering means and energizing said reset motor, means actuated by the other finger for deenergizing said reset motor and means for adjusting the positions of said fingers relative to one another thereby to regulate the quantity of fluid delivered.

13. A differential mechanism for a fluid metering system having a meter, means controlling the flow of fluid through said meter, a reset motor for resetting the parts to initial position, and a control for said controlling means and reset motor, said differential including a spider, a pair of ring gears and pinions rotatably mounted on said spider and meshing with said ring gears, one of said ring gears being driven by said meter and being operative to rotate said spider in one direction to actuate said control to actuate said controlling means to stop the flow of fluid through said metering means and energize said reset motor and the other of said ring gears being driven by said reset motor and being operative to rotate said spider in the opposite direction to actuate said control to deenergize said reset motor.

EDWARD HAROLD BRAYER.